(12) United States Patent
Liu et al.

(10) Patent No.: US 11,255,008 B2
(45) Date of Patent: Feb. 22, 2022

(54) METHOD FOR PROCESSING HIGHLY ALLOYED ALUMINUM ALLOY SHEET WITH HIGH ROLLING YIELD

(71) Applicant: Central South University, Changsha (CN)

(72) Inventors: Zhiyi Liu, Changsha (CN); Ye Chen, Changsha (CN); Jian Wang, Changsha (CN); Jing Cao, Changsha (CN); Song Bai, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 16/896,797

(22) Filed: Jun. 9, 2020

(65) Prior Publication Data
US 2021/0156006 A1   May 27, 2021

(30) Foreign Application Priority Data
Jun. 17, 2019   (CN) .......................... 201910523344.3

(51) Int. Cl.
*C22F 1/057* (2006.01)
*C21D 1/18* (2006.01)
(Continued)

(52) U.S. Cl.
CPC .............. *C22F 1/057* (2013.01); *C21D 1/18* (2013.01); *C21D 1/26* (2013.01); *C21D 1/785* (2013.01);
(Continued)

(58) Field of Classification Search
CPC . C22F 1/057; C22F 1/002; C21D 1/18; C21D 1/26; C21D 1/785; C21D 8/0226;
(Continued)

(56) References Cited

U.S. PATENT DOCUMENTS

| 2006/0011272 A1* | 1/2006 | Lin | .......................... C22C 21/16 |
| | | | 148/439 |
| 2017/0306466 A1* | 10/2017 | Meyer | ...................... C21D 1/26 |

FOREIGN PATENT DOCUMENTS

| CN | 103526140 A | 1/2014 |
| CN | 104593703 A | 5/2015 |
| CN | 106834837 A | 6/2017 |

OTHER PUBLICATIONS

Total Materia, Al—Cu—Mg—Ag Alloys, available at https://www.totalmateria.com/page.aspx?ID=CheckArticle&site=ktn&NM=240, Apr. 2010 (Year: 2010).*

\* cited by examiner

*Primary Examiner* — Rebecca Janssen
(74) *Attorney, Agent, or Firm* — Jordan IP Law, LLC; Todd A. Vaughn

(57) ABSTRACT

The present invention discloses a method for processing a highly alloyed aluminum alloy sheet with a high rolling yield, including the steps of cold rolling and hot rolling of an alloy sheet followed by heat treatment. The highly alloyed Al—Cu—Mg—Ag alloy sheet is subjected to short-time solution treatment and quenching at high temperature for multiple times by increasing the solution treatment temperature and shortening the solution treatment time. In this way, the mechanical properties of the alloy at room temperature and high temperature match with or even exceed those of a conventional alloy subjected to long-time solution treatment at high temperature. The present invention implements multiple times of short-time continuous solution treatment and quenching of a highly-alloyed coiled aluminum alloy sheet. This prevents a large amount of scraps caused by the conventional processes of segmented solution treatment and quenching of the coiled material and stretching straightening treatment.

3 Claims, 9 Drawing Sheets

(51) Int. Cl.
*C21D 1/26* (2006.01)
*C21D 8/02* (2006.01)
*C21D 9/46* (2006.01)
*C22C 21/16* (2006.01)
*C21D 1/78* (2006.01)

(52) U.S. Cl.
CPC .......... *C21D 8/0226* (2013.01); *C21D 8/0236* (2013.01); *C21D 9/46* (2013.01); *C22C 21/16* (2013.01)

(58) Field of Classification Search
CPC ........ C21D 8/0236; C21D 9/46; C22C 21/16; C22C 21/14; Y02P 10/20; B21B 3/00; B21B 2003/001
See application file for complete search history.

(Example 1)

(Example 2)

(Example 3)

(Example 4)

(Example 5)

(Example 6)

(Comparative Example 1)

METHOD FOR PROCESSING HIGHLY ALLOYED ALUMINUM ALLOY SHEET WITH HIGH ROLLING YIELD

CROSS REFERENCE TO RELATED APPLICATIONS

The present application claims priority to Chinese Patent Application No. 201910523344.3 (filed on Jun. 17, 2019), the entire content of which is incorporated herein by reference in its complete entirety.

TECHNICAL FIELD

The present invention relates to the technical field of heat treatment of metal materials, and in particular, to a method for processing a highly alloyed aluminum alloy sheet with a high rolling yield.

BACKGROUND

As an important aviation aluminum alloy, the Al—Cu—Mg alloy has high service strength and excellent fatigue damage resistance. Under the service conditions below 100° C., the Al—Cu—Mg alloy has good thermal stability, but limited heat resistance. When the service temperature is greater than 100° C., its main strengthening phases e' and S rapidly coarsen and grow up, resulting in a rapid decline in the mechanical strength of the alloy, affecting the use of aluminum alloy. An Al—Cu—Mg—Ag alloy is a heat-resistant aluminum alloy developed on the basis of the Al—Cu—Mg alloy by adding trace Ag elements, and has good welding performance, excellent high-temperature creep resistance and high-temperature thermal stability. It is widely used in aerospace industry, civil industry and other fields.

The Al—Cu—Mg—Ag alloy, as a heat-treatable strengthened alloy, has comprehensive properties satisfying application through solution treatment and aging treatment. It is found in some studies that in the Al—Cu—Mg—Ag alloy with a high Cu/Mg ratio a disk-shaped precipitate Ω, which is distributed dispersedly and is coherent with the matrix can be formed in the artificial aging process. This phase has good thermal stability and enables the alloy to resist a temperature up to about 200° C., which greatly expands the application field of the alloy. Although aging treatment is the key process to alloy's mechanical properties, but the solution treatment prior to aging is an important factor that affects the mechanical properties of the alloy. Proper solution treatment can dissolve residual second phase particles as many as possible into the matrix, thereby, more strengthening particles can be formed in the subsequent aging, so as to achieve excellent comprehensive properties.

Chinese Patent No. CN104593703A discloses a heat treatment process for a 2024 sheet. The mechanical properties and fatigue properties of the heat treated alloy have been significantly improved. Chinese Patent No. CN106834837A discloses an Al—Cu—Mg—Fe—Ni series deformed heat-resistant aluminum alloy, which has better heat resistance after solution treatment and aging treatment and has good processing performance. It is found in the above two patents and other patents that the conventional solution treatment is generally performed at 490-520° C. for 0.5-4 h. The solution treatment in two invention patents (ZL200810030979.1 and ZL201110093645.0) previously authorized by the applicant is performed up to 6 h, because the aluminum alloy with a high alloying degree needs solution treatment for a long time to dissolve the alloy elements into the matrix. An air cushion furnace is generally used for solution treatment of Al—Cu—Mg—(Ag) sheets. The sheets are treated in the air cushion furnace for a limited time, which is usually 8-15 min. This obviously cannot meet the time conditions of conventional solution treatment. Moreover, long-term solution treatment has long cycle and high energy consumption, and has a certain inhibition effect on production efficiency, energy conservation and emission reduction. Chinese Patent No. CN103526140A discloses a high-temperature short-time solid solution (505-535° C./1-25 min) quenching heat treatment method capable of improving the fatigue resistance of an Al—Cu—Mg alloy. The Al—Cu—Mg alloy targeted by the process has a low alloying degree, while for a highly alloyed aluminum alloy, the coarse second phase particles in the matrix are certainly more than those of an alloy with a low alloying degree, resulting in increased difficulty in the solution treatment process for eliminating the second phase particles. At present, the highly alloyed aluminum alloy sheets are subjected to long-time solution treatment in a salt bath furnace or a roller bottom quenching furnace in a segmented mode respectively, and then subjected to quenching and straightening treatment. This method causes a large amount of scraps to be generated. Since the segmented solid solution and straightening treatment after quenching need to waste a large amount of heads and corners of clamped sheet, the rolling yield is reduced. Moreover, the sheets are easy to scratch in the process of segmentation, solution treatment and quenching and straightening, causing a large number of waste products. In addition, the highly alloyed aluminum alloy is prone to edge cracking and even belt breakage during sheet rolling, which also greatly reduce the rolling yield. Therefore, it is of great commercial value to develop a suitable cold rolling and hot rolling process and a solution treatment process for a highly alloyed aluminum alloy sheet to realize the actual industrial production of the highly alloyed aluminum alloy sheet with a high rolling yield.

SUMMARY

In order to solve the problems existing in the prior art, the present invention provides a method for processing a highly alloyed aluminum alloy sheet with a high rolling yield, which solves the problems mentioned in the above background technology.

The objective of the present invention is realized through the following technical solution: a method for processing a highly alloyed aluminum alloy sheet with a high rolling yield, including the following steps:

S1: heating a rolled Al—Cu—Mg—Ag sheet to 515-535° C. in an air cushion furnace, keeping the temperature for 5-15 min, and making a coiled material enter a quenching water tank to finish alloy quenching after primary solution treatment, which is called primary solution treatment and quenching;

S2: repeating step S1 2-4 times, to perform solution treatment and quenching for multiple times;

S3: naturally aging the water quenched alloy sheet at room temperature for 18-36 h; and S4: subjecting the alloy sheet after step S3 to artificial aging treatment to a required aging state.

Further, the artificial aging treatment in step S4 includes heating the alloy sheet to 180-200° C., keeping the temperature for 45-120 min, taking the alloy sheet out of the furnace for air cooling to below 150° C., then heating the alloy sheet to 150-175° C., keeping the temperature for 10-16 h, and taking the alloy sheet out of the furnace for air cooling to room temperature.

Further, the processing steps of the cold-rolled Al—Cu—Mg—Ag alloy sheet include heating the alloy sheet to 360-480° C., and hot rolling the alloy sheet to 3-5 mm; heating the alloy sheet to 400-450° C., keeping the temperature for 3-7 h, and annealing; and finally cold rolling to obtain a 0.60-2.0 mm sheet.

Further, in the cold rolling, intermediate annealing treatment is performed after each 20-50% cold rolling, where the intermediate annealing treatment includes heating the sheet to 400-450° C., keeping the temperature for 3-7 h, and then taking the sheet out of the furnace for air cooling.

Further, the cold-rolled Al—Cu—Mg—Ag alloy sheet includes the following components in percentage by weight: Cu 5.7-6.8%, Mg 0.30-0.58%, Ag 0.82-1.8%, Mn 0.45-0.63%, Zr 0.08-0.15%, Ti 0.05-0.15%, Fe<0.06%, Si<0.06%, and the balance Al.

Further, the cold-rolled Al—Cu—Mg—Ag alloy sheet includes the following components in percentage by weight: Cu 5.9-6.5%, Mg 0.38-0.48%, Ag 1.12-1.51%, Mn 0.51-0.59%, Zr 0.09-0.12%, Ti 0.08-0.12%, Fe<0.05%, Si<0.05%, and the balance Al.

The present invention has the beneficial effects: the process is simple and reasonable; the obtained highly alloyed Al—Cu—Mg—Ag sheet has no crack, no strip breakage and high dimensional accuracy by increasing the hot rolling finishing rolling temperature and the hot rolling deformation distribution amount, reducing the cold rolling pass deformation and increasing the intermediate annealing times and annealing temperature. By increasing the solid solution temperature and shortening the solid solution time, the highly alloyed Al—Cu—Mg—Ag sheet is subjected to short-time solution treatment and quenching at high temperature for multiple times instead of conventional methods of segmented solution treatment and segmented straightening. This greatly increases the yield in preparation and processing of the Al—Cu—Mg—Ag alloy sheet while the mechanical properties of the alloy at room temperature and high temperature match with or even exceed those of a conventional solid solution heat treated alloy. The process for preparing the highly alloyed aluminum alloy sheet according to the present invention is suitable for the existing industrial production, greatly increases the yield, saves production costs, improves production efficiency, and has good industrial application value.

DETAILED DESCRIPTION

The technical solution in the practice example of the present invention is clearly and completely described as follows by combining the accompanying drawings in the examples of the present invention. Apparently, the described examples are merely a part of examples, rather than all of the examples of the present invention. All other examples obtained by a person of ordinary skill in the art based on the examples of the present invention without creative efforts shall fall within the protection scope of the present invention.

Figure 1:
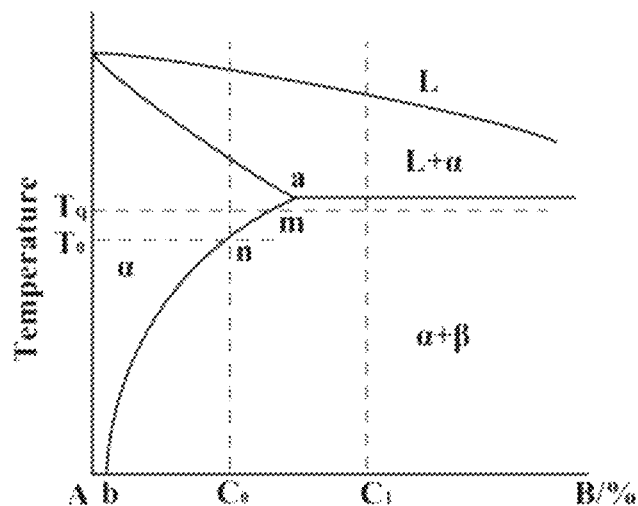
FIG. 1 is a phase diagram of a binary aluminum alloy with solubility changes.
Figure 2:
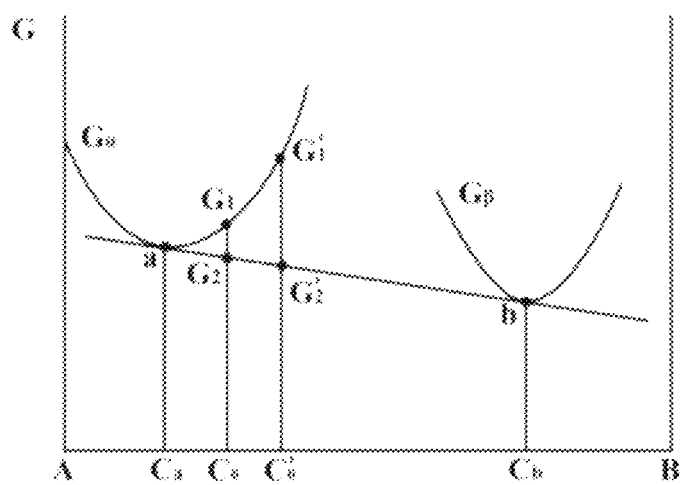
FIG. 2 is a composition-free energy curve of solid solution aging precipitation.
Figure 3A:
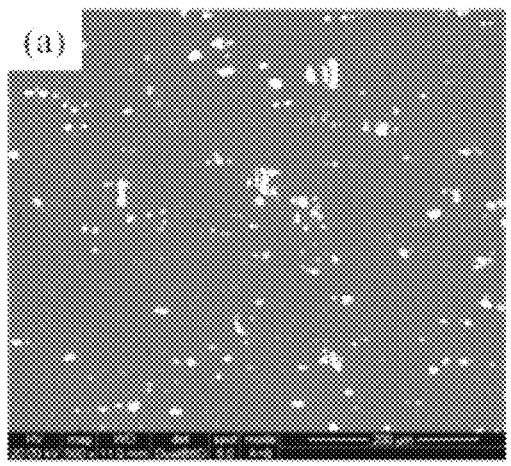
FIGS. 3(a)-(g) are SEM images of alloys of Examples 1-6 and Comparative Example 1 after different solution treatments.
Figure 3B:
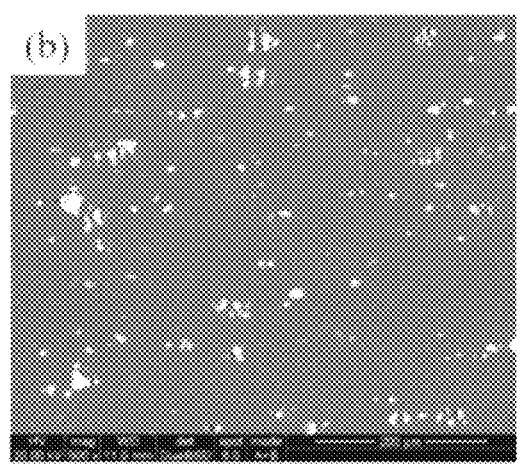
Figure 3C:
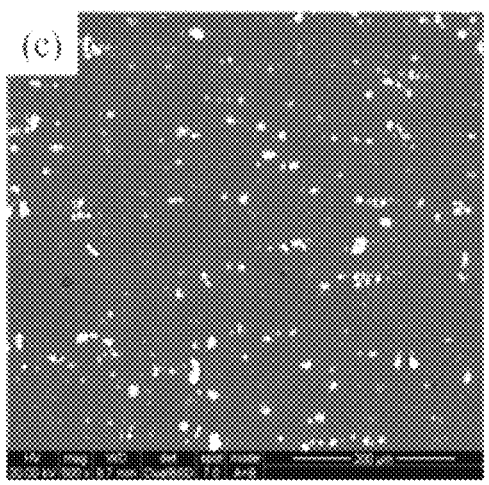
Figure 3D:
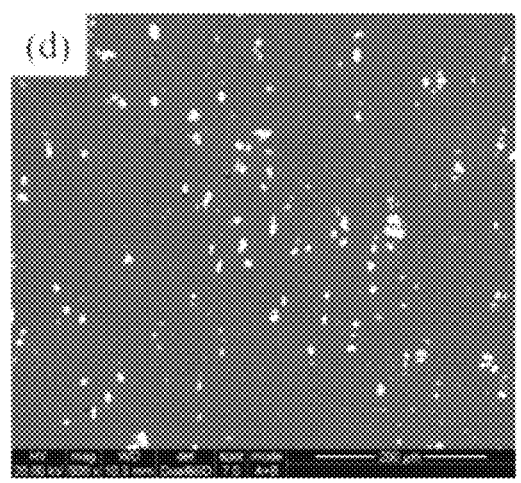
Figure 3E:
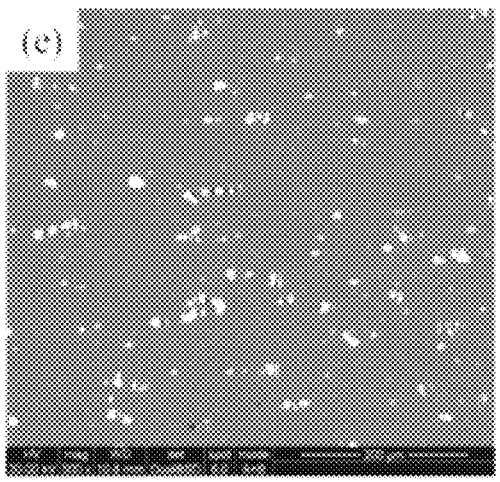
Figure 3F:
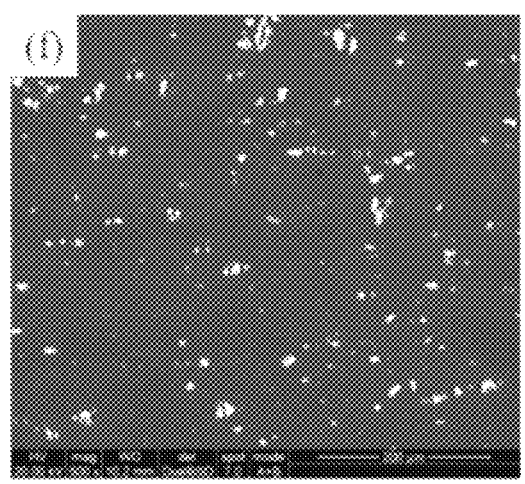
Figure 3G:
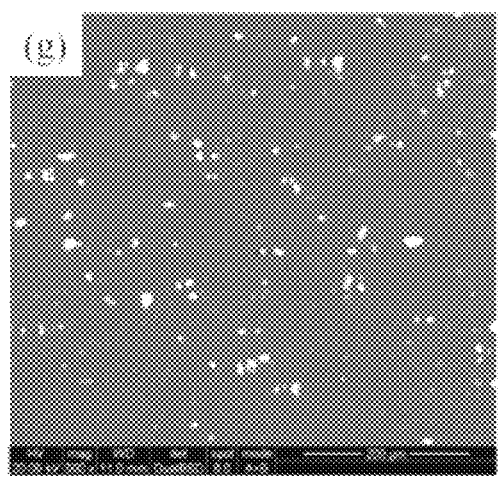
Figure 4:
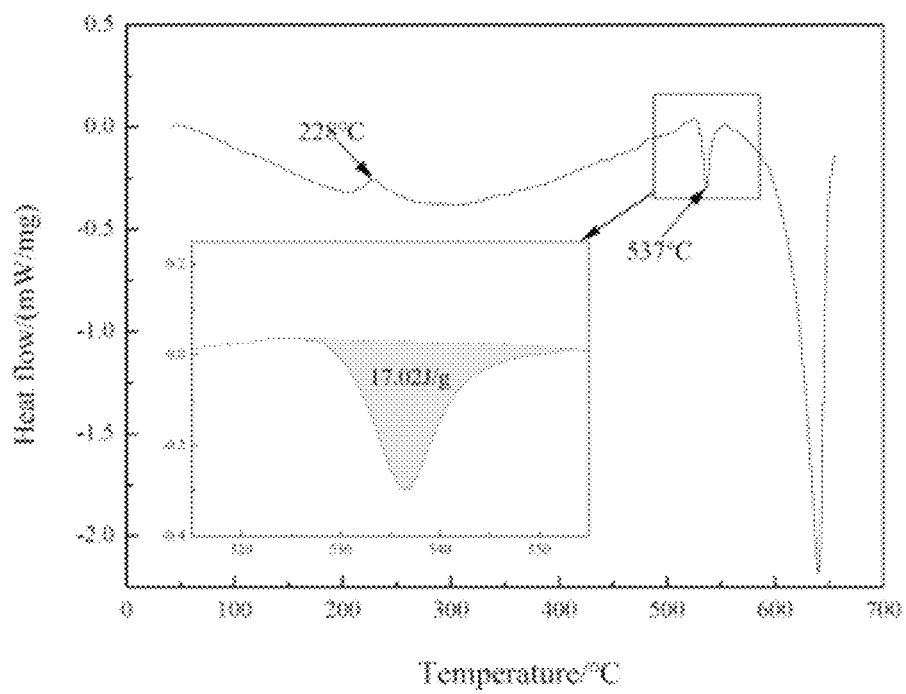
FIG. 4 is a DSC curve of the alloy of Example 1 after solution treatment at 530° C. for 10 min.
Figure 5:
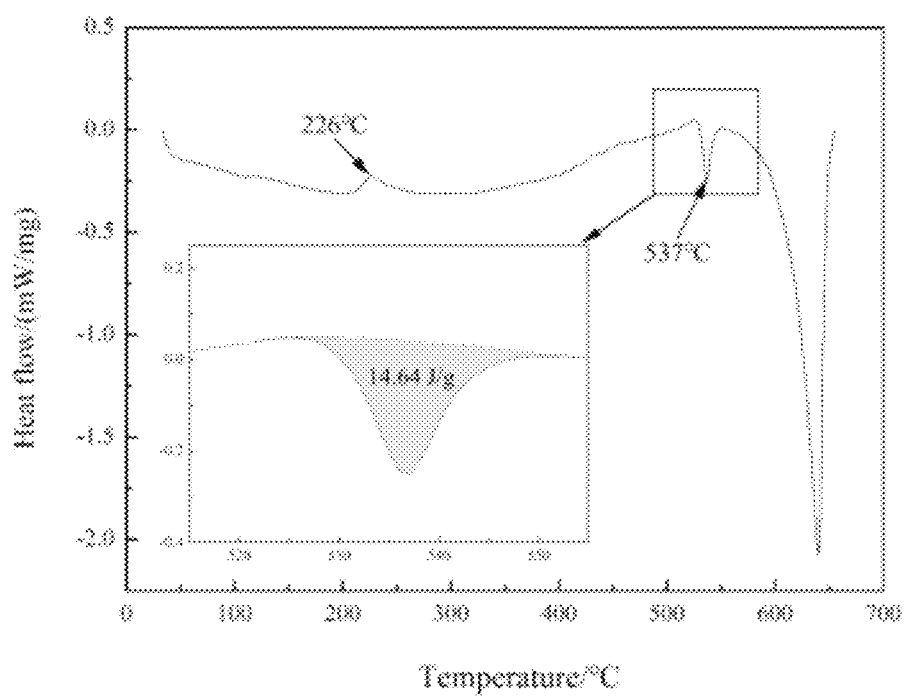
FIG. 5 is a DSC curve of the alloy of Example 2 after solution treatment at 525° C. for 12 min.
Figure 6:
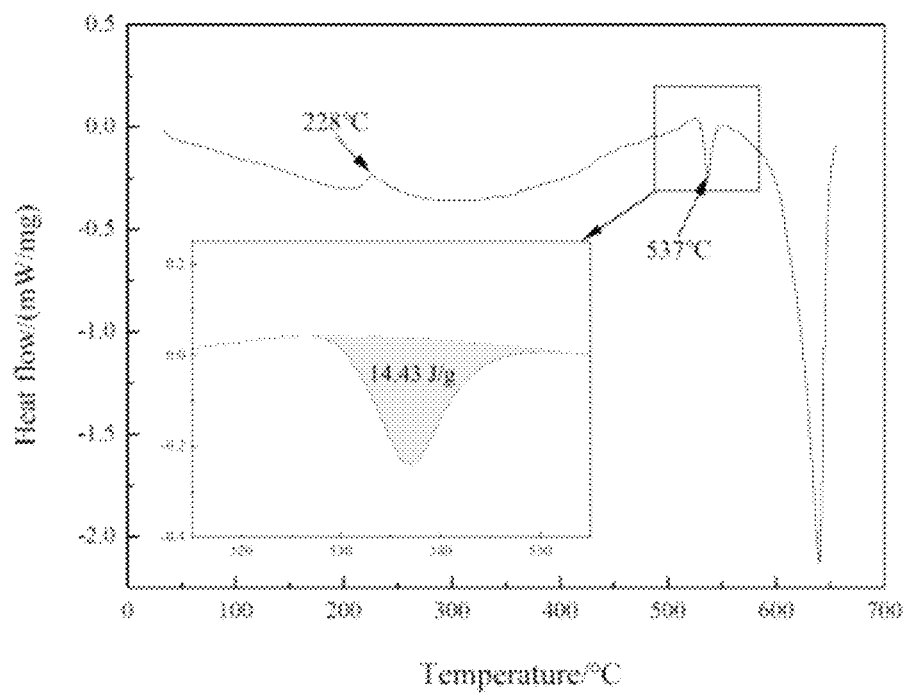
FIG. 6 is a DSC curve of the alloy of Example 3 after two solution treatments at 527° C. for 10 min (secondary solution treatment)
Figure 7:
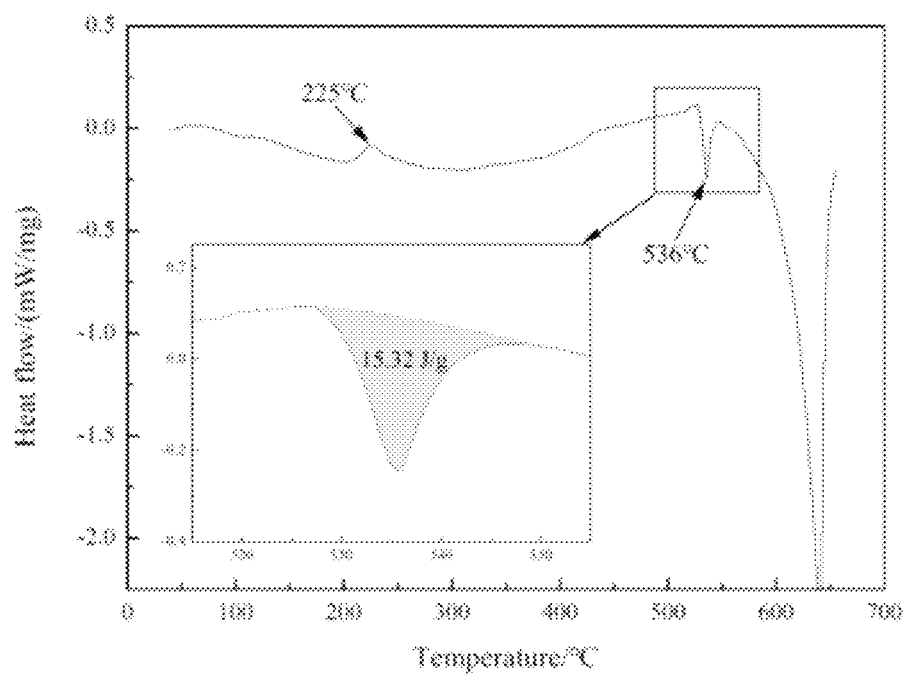
FIG. 7 is a DSC curve of the alloy of Example 4 after solution treatment at 527° C. for 12 min.
Figure 8:
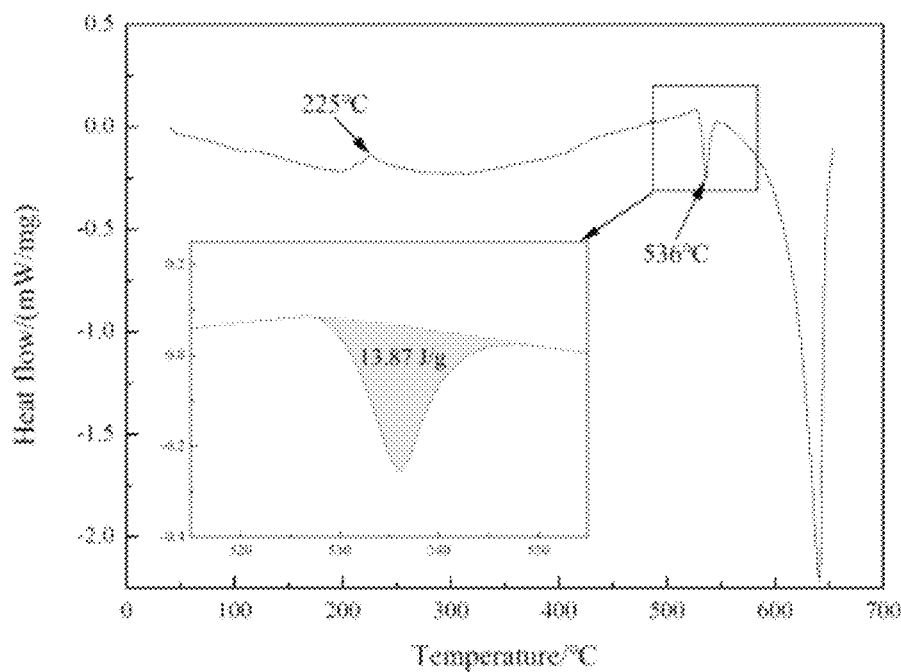
FIG. 8 is a DSC curve of the alloy of Example 5 after solution treatment at 527° C. for 10 min.
Figure 9:
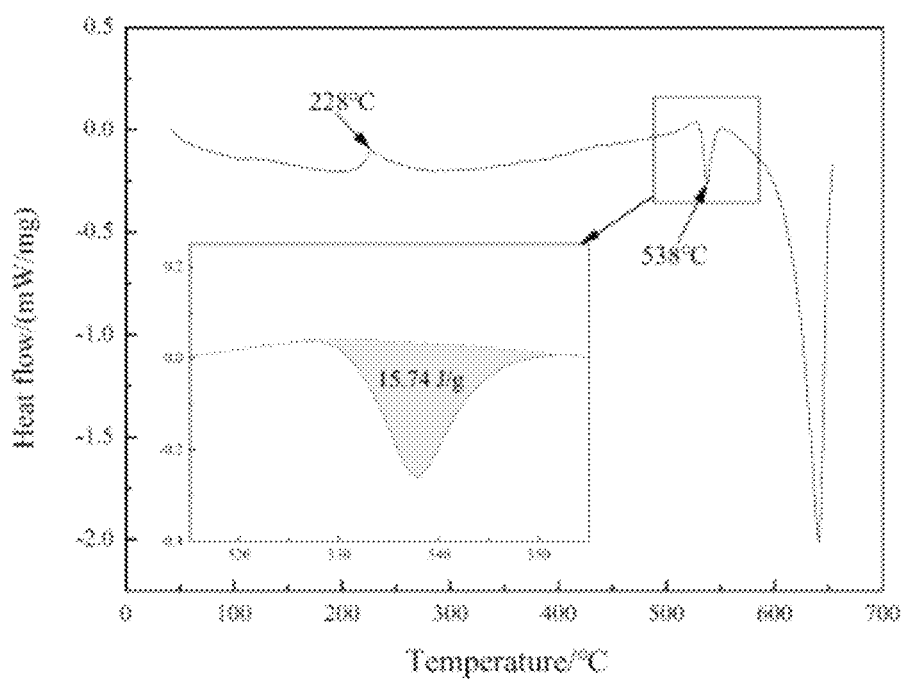
FIG. 9 is a DSC curve of the alloy of Example 6 after three solution treatments at 527° C. for 10 min (tertiary solution treatment)
Figure 10:
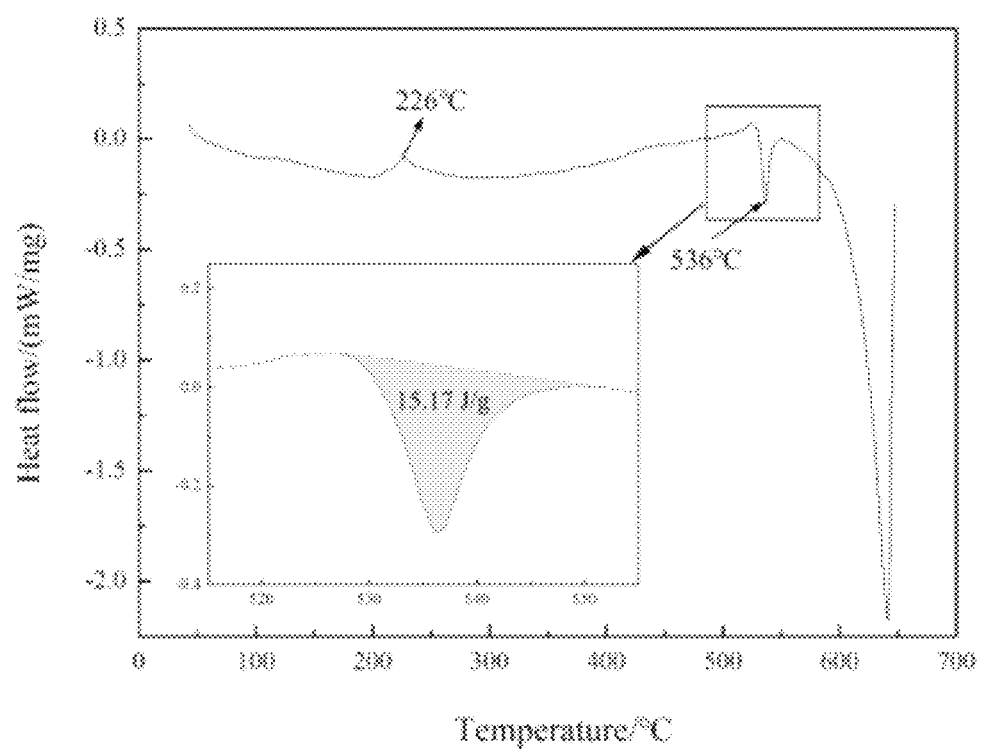
FIG. 10 is a DSC curve of the alloy of Comparative Example 1 after solution treatment at 520° C. for 4 h.

Referring to FIGS. 1-10, the present invention provides a method for processing a highly alloyed aluminum alloy sheet with a high rolling yield, including a cold and hot rolling process and a heat treatment process, where the cold and hot rolling process includes the following steps of: heating an alloy sheet to 360-480° C., and hot rolling the alloy sheet to 3-5 mm; heating the alloy sheet to 400-450° C., keeping the temperature for 3-7 h, and annealing; finally, cold rolling the sheet to 0.60-2.0 mm, performing intermediate annealing treatment after each 20-50% cold rolling, where the intermediate annealing treatment includes heating the sheet to 400-450° C., keeping the temperature for 3-7 h, and then taking the sheet out of a furnace for air cooling. The process features higher hot rolling initial rolling temperature and finishing rolling temperature (380° C.-480° C.), larger hot rolling deformation distribution amount, smaller cold rolling pass deformation (20-50%) and an intermediate annealing process with more times and higher temperature. The process for heat treatment of an Al—Cu—Mg—Ag alloy sheet coiled material includes the following steps: Si, heating a rolled Al—Cu—Mg—Ag sheet to 515-535° C. in an air cushion furnace, keeping the temperature for 5-15 min, making the coiled material enter a quenching water tank to finish alloy quenching after primary solution treatment, which is called primary solution treatment and quenching; S2, repeating step S1 2-4 times, to perform solution treatment and quenching for multiple times; S3, naturally aging the water quenched alloy sheet at room temperature for 18-36 h; and S4, subjecting the alloy sheet after step S3 to artificial aging treatment to a required aging state. The artificial aging treatment includes heating the alloy sheet to 180-200° C., keeping the temperature for 45-120 min, taking the alloy sheet out of the furnace for air cooling to below 150° C., then heating the alloy sheet to 150-175° C., keeping the temperature for 10-16 h, and taking the alloy sheet out of the furnace for air cooling to room temperature.

The cold-rolled Al—Cu—Mg—Ag alloy sheet includes the following components in percentage by weight: Cu 5.7-6.8%, Mg 0.30-0.58%, Ag 0.82-1.8%, Mn 0.45-0.63%, Zr 0.08-0.15%, Ti 0.05-0.15%, Fe<0.06%, Si<0.06%, and the balance Al.

The cold-rolled Al—Cu—Mg—Ag alloy sheet includes the following components in percentage by weight: Cu 5.9-6.5%, Mg 0.38-0.48%, Ag 1.12-1.51%, Mn 0.51-0.59%, Zr 0.09-0.12%, Ti 0.08-0.12%, Fe<0.05%, Si<0.05%, and the balance Al.

Edge cracks and even strip breakage easily occur in the rolling process of the highly alloyed aluminum alloy, resulting in more scraps, low yield and even processing accidents. For the sheet rolling of the highly alloyed Al—Cu—Mg—Ag alloy, the applicant has performed the laboratory research and the rolling on an actual production line. The results show that the increasing of the initial rolling and finishing rolling temperatures, and the increasing of the hot rolling deformation distribution amount, by which the alloy thermoplasticity is fully employed, is beneficial to the preparation of the highly alloyed aluminum alloy sheet. The probability of occurrence of edge cracks and strip breakage can be reduced by using smaller cold rolling pass deformation and increasing intermediate annealing times and annealing temperature. Therefore, the yield in the whole hot rolling and cold rolling process is improved. Verification of the industrial hot rolling and cold rolling process shows that the highly alloyed Al—Cu—Mg—Ag sheet with no edge crack and size accuracy meeting the requirements can be obtained by adopting the cold rolling and hot rolling process of the present invention.

The main purpose of solution treatment is to massively dissolve Cu, Mg, Ag and other elements in the alloy into the matrix to obtain a solid solution with maximum supersaturation without overburning of the alloy. The solid solution process is a process of atomic diffusion, which is mainly affected by the solid solution temperature, solid solution time, quenching cooling rate and other factors, of which the most influential factor is the solid solution temperature. An appropriate increase in the solid solution temperature is generally conducive to the increase of matrix solid solution concentration. It can be seen from FIG. 1 that the binary aluminum alloy with composition CO has room temperature structure α+β phase, where α is matrix solid solution and β phase is the second phase in the alloy. When the alloy is at a temperature above Tq, the β phase will be completely dissolve back into the aluminum matrix to form a single a solid solution. If the alloy is cooled down at a fast enough rate, the atoms of alloy elements will not have time to diffuse and redistribute, thus forming a single a supersaturated solid solution at room temperature. As the solubility of alloy elements decreases with the decrease of temperature and the supersaturated solid solution is in a metastable state, the β phase is precipitated in the subsequent aging heating process to achieve the purpose of strengthening the alloy. In can be seen from FIG. 2 that the driving force for aging precipitation is the volume free energy difference between the new phase and the solid solution. When the average concentration of alloy elements in the solid solution is CO, the driving force for precipitation of the β phase is G1-G2. With the increase of solid solubility of the alloy, the concentration of alloy elements increases from C0 to C0', and in this case the free energy difference of precipitate is G1'-G2'. Obviously, the free energy difference of the latter is greater than that of the former, that is, the solid solution with higher concentration CO' has greater precipitation driving force, and when the driving force is greater, the nucleation energy and critical nucleation radius of the precipitate are smaller, and the precipitation is performed more easily. Therefore, for a certain alloy, increasing the solid solution temperature can significantly increase the supersaturation degree of the alloy solid solution and promote the precipitation of subsequent strengthening phases. Generally, when the solid solution temperature is higher, the re-dissolution speed of the residual second phase is faster, and the required solid solution time is shorter. According to the present invention, with respect to the rolled highly-alloyed Al—Cu—Mg—Ag sheet, on the premise that equivalent performances can be achieved, the solid solution temperature is increased and the solid solution time is shortened, so as to meet the existing industrial production technical conditions. A process of multiple solution treatments is selected, which is an experimental solution designed considering the actual production conditions of factories, and its essence is to prolong the solid solution time.

Residual second phase particles in the alloy matrix after different solution treatments can be seen from FIGS. 3(a)-(g). It is found that the number of the residual second phase particles in FIGS. 1-6 is equal to that of the residual second phase particles in FIG. 10, and there is no particularly significant difference. It can be seen from DSC curves of FIGS. 4-10 that an exothermic peak occurs at 226±2° C. in all alloys, which corresponds to the precipitation of a strengthening phase; and a large exothermic peak appears at 537±1° C., corresponding to the dissolution of the residual second phase in the matrix. The area of the exothermic peak in the DSC curve corresponds to the thermal effect (i.e., enthalpy change) occurring when the residual second phase in the matrix dissolves, which indirectly reflects the volume fraction of the residual second phase in the alloy after solution treatment.

Such a process of multiple solution treatments, replacing the conventional methods of segmented solution treatment and quenching and segmented stretching and straightening, and is combined with the process adopting high initial rolling and finishing rolling temperatures of highly alloyed aluminum alloy, large hot rolling deformation distribution amount, small cold rolling pass deformation and multiple intermediate annealing treatments according to the present invention. As a result, the scraps of the highly alloyed Al—Cu—Mg—Ag alloy sheet are greatly reduced, and the yield is greatly improved.

Example 1

An alloy 1 includes 6.8% of Cu, 0.39% of Mg, 1.1% of Ag, 0.5% of Mn, 0.12% of Zr, 0.05% of Ti, and the balance Al. An alloy rolling process includes steps of: heating an alloy sheet to 380-480° C., and hot rolling the alloy sheet to 5 mm; heating the alloy sheet to 400-450° C., keeping the temperature for 3-7 h, and taking the sheet out of a furnace for air cooling; finally, cold rolling the sheet to 2.0 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet in an air cushion furnace at 530° C. for 10 min, then entering a water tank for quenching, naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 524 Mpa, yield strength 489 Mpa, and elongation 7.9%; mechanical properties at high temperature (at 200° C.): tensile strength 410 MPa, yield strength 388 MPa, and elongation 12.5%.

Example 2

An alloy 2 includes 6.5% of Cu, 0.41% of Mg, 1.0% of Ag, 0.63% of Mn, 0.15% of Zr, 0.08% of Ti, and the balance Al. An alloy rolling process includes steps of: heating an alloy sheet to 380-480° C., and hot rolling the alloy sheet to 4 mm; heating the alloy sheet to 400-450° C., keeping the temperature for 3-7 h, and taking the sheet out of a furnace for air cooling; finally, cold rolling the sheet to 1.5 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 525° C. for 12 min, then quenching, naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 516 Mpa, yield strength 481 Mpa, and elongation 8.8%; mechanical properties at high temperature (at 200° C.): tensile strength 410 MPa, yield strength 394 MPa, and elongation 12.9%.

Example 3

An alloy 3 includes 6.2% of Cu, 0.44% of Mg, 0.82% of Ag, 0.62% of Mn, 0.14% of Zr, 0.09% of Ti, and the balance Al. An alloy rolling process includes steps of: heating an alloy sheet to 380-480° C., and hot rolling the alloy sheet to 3 mm; heating the alloy sheet to 400-450° C., keeping the temperature for 3-7 h, and taking the sheet out of a furnace for air cooling; finally, cold rolling the sheet to 0.6 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 527° C. for 10 min, and then entering a water tank for quenching; after the quenching, keeping the temperature of the alloy sheet at 527° C. for 10 min, entering the water tank for quenching, namely secondary solution treatment and quenching, naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 520 Mpa, yield strength 485 Mpa, and elongation 8.6%; mechanical properties at high temperature (at 200° C.): tensile strength 404 MPa, yield strength 388 MPa, and elongation 13.0%.

Example 4

An alloy 4 includes 5.7% of Cu, 0.30% of Mg, 1.80% of Ag, 0.45% of Mn, 0.12% of Zr, 0.07% of Ti, and the balance Al. An alloy rolling process includes steps of: heating an alloy sheet to 360-480° C., and hot rolling the alloy sheet to 3.5 mm; heating the alloy sheet to 400-450° C., keeping the temperature for 3-7 h, and taking the sheet out of a furnace for air cooling; finally, cold rolling the sheet to 1.5 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet in a furnace at 527° C. for 12 min, then entering a water tank for quenching, naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 521 Mpa, yield strength 483 Mpa, and elongation 8.3%; mechanical properties at high temperature (at 200° C.): tensile strength 406 MPa, yield strength 390 MPa, and elongation 12.7%.

Example 5

An alloy 5 includes 5.9% of Cu, 0.36% of Mg, 1.51% of Ag, 0.50% of Mn, 0.10% of Zr, 0.10% of Ti, and the balance Al. An alloy rolling process includes steps of: heating an alloy sheet to 380-480° C., and hot rolling the alloy sheet to 4.5 mm; heating the alloy sheet to 400-450° C., keeping the temperature for 3-7 h, and taking the sheet out of a furnace for air cooling; finally, cold rolling the sheet to 2.0 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 527° C. for 10 min, then quenching, naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 519 Mpa, yield strength 484 Mpa, and elongation 8.3%; mechanical properties at high temperature (at 200° C.): tensile strength 397 MPa, yield strength 383 MPa, and elongation 12.1%.

Example 6

An alloy 6 includes 6.3% of Cu, 0.44% of Mg, 0.82% of Ag, 0.62% of Mn, 0.14% of Zr, 0.15% of Ti, and the balance Al. An alloy rolling process includes steps of: heating an alloy sheet to 380-480° C., and hot rolling the alloy sheet to 4 mm; heating the alloy sheet to 400-450° C., keeping the temperature for 3-7 h, and taking the sheet out of a furnace for air cooling; finally, cold rolling the sheet to 1.5 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 527° C. for 10 min; after quenching, heating the alloy sheet to 527° C. and keeping the temperature for 10 min, and then quenching; heating to 527° C. and keeping the temperature for 10 min, namely performing tertiary solution treatment, and then quenching; naturally aging for 18-36 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 536 Mpa, yield strength 500 Mpa, and elongation 9.4%; mechanical properties at high temperature (at 200° C.): tensile strength 412 MPa, yield strength 399 MPa, and elongation 12.2%.

Example 7

An alloy 7 includes 5.9% of Cu, 0.41% of Mg, 1.20% of Ag, 0.63% of Mn, 0.09% of Zr, 0.12% of Ti, and the balance Al. An alloy rolling process includes steps of: heating an alloy sheet to 380-480° C., and hot rolling the alloy sheet to 5 mm; heating the alloy sheet to 400-450° C., keeping the temperature for 3-7 h, and taking the sheet out of a furnace for air cooling; finally, cold rolling the sheet to 2.0 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 525° C. for 10 min; after quenching, heating the alloy sheet to 525° C. and keeping the temperature for 10 min, namely performing secondary solution treatment, and then quenching; naturally aging for 18-36 h, and then performing aging treatment. The mechanical properties of the alloy at room temperature after the above heat treatment were: tensile strength 519 Mpa, yield strength 484 Mpa, and elongation 8.7%; mechanical properties at high temperature (at 200° C.): tensile strength 404 MPa, yield strength 395 MPa, and elongation 12.5%.

Example 8

An alloy 8 includes 6.1% of Cu, 0.58% of Mg, 1.48% of Ag, 0.53% of Mn, 0.08% of Zr, 0.08% of Ti, and the balance Al. An alloy rolling process includes steps of: heating an alloy sheet to 380-480° C., and hot rolling the alloy sheet to 3 mm; heating the alloy sheet to 400-450° C., keeping the temperature for 3-7 h, and taking the sheet out of a furnace for air cooling; finally, cold rolling the sheet to 0.6 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 525° C. for 10 min; after quenching, heating the alloy sheet to 525° C. and keeping the temperature for 10 min, and then quenching; heating to 525° C. and keeping the temperature for 10 min, namely performing third solution treatment, and then quenching; naturally aging for 18-36 h, and then performing aging treatment. The mechanical properties of the alloy at room temperature after the above heat treatment were: tensile strength 520 Mpa, yield strength 487 Mpa, and elongation 8.9%; mechanical properties at high temperature (at 200° C.): tensile strength 409 MPa, yield strength 394 MPa, and elongation 11.8%.

Comparative Example 1

An alloy 9 includes 5.8% of Cu, 0.50% of Mg, 1.43% of Ag, 0.36% of Mn, 0.16% of Zr, 0.09% of Ti, and the balance Al. An alloy rolling process includes steps of: heating an alloy sheet to 380-480° C., and hot rolling the alloy sheet to 5 mm; heating the alloy sheet to 400-450° C., keeping the temperature for 3-7 h, and taking the sheet out of a furnace for air cooling; finally, cold rolling the sheet to 2.0 mm, performing intermediate annealing treatment after each 20-50% cold rolling (heating the sheet to 400-450° C. and keeping the temperature for 3-7 h), and obtaining a sheet free of edge cracks; keeping the temperature of the rolled sheet at 520° C. for 4 h, then quenching, naturally aging for 24 h, and then performing aging treatment. Part of the solution quenched alloy was cut off and made into a sample. The amount of a residual second phase in the alloy was analyzed by a scanning electron microscope and a differential scanning calorimeter (DSC). The mechanical properties of the alloy at room temperature after the above heat treatment were: tensile strength 520 Mpa, yield strength 482 Mpa, and elongation 9.0%; mechanical properties at high temperature (at 200° C.): tensile strength 413 MPa, yield strength 401 MPa, and elongation 11.9%.

Comparative Example 2

An alloy 10 includes 6.45% of Cu, 0.43% of Mg, 1.42% of Ag, 0.36% of Mn, 0.16% of Zr, 0.09% of Ti, and the balance Al. An alloy rolling process includes steps of: heating an alloy sheet to 380-470° C., and hot rolling the alloy sheet to 5 mm; heating the alloy sheet to 400-450° C., keeping the temperature for 3-7 h, and taking the sheet out of a furnace for air cooling; cold rolling the sheet to 2.0 mm, where when the cold rolling deformation reaches 60%, a sheet coiled material is subjected to strip breakage and edge cracks, and no intermediate annealing treatment is performed.

It can be seen from the DSC curve diagrams shown that the volume fraction order of the residual second phases of the alloys after different solution treatments is as follows: Example 2 (525° C./12 min, 17.02 J/g)>Example 5 (527° C./10 min, 15.74 J/g)>Example 3 (two solution treatments at 527° C. for 10 min (secondary solution treatment), 15.32 J/g)>Comparative Example 1 (520° C./4 h, 15.17 J/g)>Example 1 (530° C./10 min, 14.64 J/g)>Example 4 (527° C./10 min, 14.43 J/g)>Example 6 (three solution treatments at 527° C. for 10 min (tertiary solution treatment), 13.87 J/g). This shows that the solution effect of multiple high-temperature short-time solution treatments is equivalent to or even slightly better than that of the conventional solution treatment (520° C./4 h).

Although the present invention has been described in detail with reference to the foregoing examples, those skilled in the art can still modify the technical solutions described in the foregoing examples, or replace some of the technical features of the examples. Any modifications, equivalent replacements, improvements, etc. within the spirit and principle of the present invention should fall within the protection scope of the present invention.

What is claimed is:
1. A method for processing a highly alloyed aluminum alloy sheet with a high rolling yield, comprising the following steps:
   S1: heating a rolled Al—Cu—Mg—Ag sheet as a coiled material to a temperature of 525-535° C. in an air cushion furnace, maintaining the temperature for 5-15 min, and making the coiled material enter a quenching water tank to finish alloy quenching after primary solution treatment, which is called primary solution treatment and quenching, wherein the rolled Al—Cu—Mg—Ag sheet comprises the following components in percentage by weight: Cu 5.7-6.8%, Mg 0.30-0.58%, Ag 0.82-1.8%, Mn 0.45-0.63%, Zr 0.08-0.15%, Ti 0.05-0.15%, Fe<0.06%, Si<0.06%, and the balance Al;
   S2: repeating step S1 0-3 times, to perform solution treatment and quenching for multiple times;
   S3: naturally aging the water quenched alloy sheet at room temperature for 18-36 h; and
   S4: subjecting the alloy sheet after step S3 to artificial aging treatment to a required aging state,
   wherein the rolled Al—Cu—Mg—Ag sheet is prepared by:
   heating the alloy sheet to a temperature of 360-480° C., and hot rolling the alloy sheet to 3-5 mm;
   heating, after hot-rolling the alloy sheet, the alloy sheet to a temperature of 400-450° C., maintaining the temperature for 3-7 hours, and annealing; and cold rolling, after annealing, to obtain a 0.60-2.0 mm sheet, wherein during the cold rolling, an intermediate annealing treatment is performed after each 20-50% cold rolling, the intermediate annealing treatment comprising heating the alloy sheet to a temperature of 400-450° C., maintaining the temperature for 3-7 hours, and then taking the sheet out of the air cushion furnace for air cooling.

2. The method of claim 1, wherein the artificial aging treatment in step S4 comprises heating the alloy sheet to 180-200° C., keeping the temperature for 45-120 min, taking the alloy sheet out of the furnace for air cooling to below 150° C., then heating the alloy sheet to 150-175° C., keeping the temperature for 10-16 h, and taking the alloy sheet out of the furnace for air cooling to room temperature.

3. The method of claim 1, wherein the rolled Al—Cu—Mg—Ag sheet comprises the following components in percentage by weight: Cu 5.9-6.5%, Mg 0.38-0.48%, Ag 1.12-1.51%, Mn 0.51-0.59%, Zr 0.09-0.12%, Ti 0.08-0.12%, Fe<0.05%, Si<0.05%, and the balance Al.

* * * * *